US012673327B2

(12) United States Patent
Kujansuu et al.

(10) Patent No.: US 12,673,327 B2
(45) **Date of Patent: *Jul. 7, 2026**

(54) FRETTING WEAR REDUCTION IN INTERFERENCE FIT OF CONE CRUSHER HEAD

(71) Applicant: METSO FINLAND OY, Espoo (FI)

(72) Inventors: Petri Kujansuu, Espoo (FI); Mikko Merikoski, Espoo (FI)

(73) Assignee: Metso Finland Oy, Espoo (FI)

( * ) Notice: Subject to any disclaimer, the term of this patent is extended or adjusted under 35 U.S.C. 154(b) by 209 days.

This patent is subject to a terminal disclaimer.

(21) Appl. No.: 18/569,851

(22) PCT Filed: Jun. 6, 2022

(86) PCT No.: PCT/FI2022/050385

§ 371 (c)(1), (2) Date: Dec. 13, 2023

(87) PCT Pub. No.: WO2023/275432

PCT Pub. Date: Jan. 5, 2023

(65) Prior Publication Data

US 2024/0261791 A1 Aug. 8, 2024

(30) Foreign Application Priority Data

Jun. 28, 2021 (FI) ..................................... 20215758

(51) Int. Cl.
*B02C 2/04* (2006.01)

(52) U.S. Cl.
CPC ..................................... *B02C 2/04* (2013.01)

(58) Field of Classification Search
CPC ........................................................ B02C 2/04
See application file for complete search history.

(56) References Cited

U.S. PATENT DOCUMENTS

| | | | | |
|---|---|---|---|---|
| 2002/0170995 A1 | 11/2002 | Jean | | |
| 2015/0129696 A1* | 5/2015 | Andrienko | ............. | B02C 2/042 241/215 |

(Continued)

FOREIGN PATENT DOCUMENTS

| | | |
|---|---|---|
| EP | 2774682 A1 | 9/2014 |
| EP | 3778969 A1 | 2/2021 |
| JP | 2001190968 A | 7/2001 |

OTHER PUBLICATIONS

International Search Report and Written Opinion for PCT/FI2022/050385, mailed Sep. 21, 2022.

(Continued)

*Primary Examiner* — Mohammed S. Alawadi

(74) *Attorney, Agent, or Firm* — Andrus Intellectual Property Law, LLP

(57) ABSTRACT

A system, cone crusher and its main shaft that includes an interference fit section for supporting a crusher head. The interference fit section has a nominal interference fit diameter $D_{if}$, a bottom shaft section extending between a bottom end of the main shaft and the interference fit section, and having a bottom part and a neck part. The bottom part has a bottom part length $L_{bp}$ and a bottom part diameter $D_{bp}$ that is constant below the neck part on at least 50% of the bottom part length $L_{bp}$. The neck part has a neck part diameter growing towards the interference fit section. The main shaft has a main shaft length $L_{ms}$. $L_{ms}^{1.3}/D_{if}$ is at most 40 mm$^{1.3}$. $D_{bp}^{1.421}/D_{if}$ is at most 9.0 mm$^{0.421}$.

17 Claims, 3 Drawing Sheets

(56) References Cited

U.S. PATENT DOCUMENTS

| | | | | |
|---|---|---|---|---|
| 2016/0008817 | A1* | 1/2016 | Bergman | B02C 2/02 241/215 |
| 2016/0271614 | A1 | 9/2016 | Bergman | |
| 2018/0036736 | A1 | 2/2018 | Andrienko | |
| 2019/0099760 | A1* | 4/2019 | O'Bryan | B02C 2/02 |
| 2020/0306762 | A1 | 10/2020 | Boulay | |
| 2021/0402410 | A1* | 12/2021 | Gunnarsson | B02C 2/06 |

OTHER PUBLICATIONS

Finnish Search Report for Finnish Patent Application No. 20215758, dated Jan. 24, 2022.

Office action and search report for Chinese Patent Application No. 202280044789.3, published Nov. 24, 2025.

* cited by examiner

FRETTING WEAR REDUCTION IN INTERFERENCE FIT OF CONE CRUSHER HEAD

CROSS-REFERENCE TO RELATED APPLICATIONS

This application is the U.S. national stage application of International Application PCT/FI2022/050385, filed Jun. 6, 2022, which international application was published on Jan. 5, 2023, as International Publication WO 2023/275432 A1 in the English language. The International Application claims priority of Finnish Patent Application No. 20215758 filed Jun. 28, 2021.

TECHNICAL FIELD

The present disclosure generally relates to fretting wear reduction in an interference fit of a cone crusher head.

BACKGROUND

This section illustrates useful background information without admission of any technique described herein representative of the state of the art.

In a cone crusher, a crusher head is supported and driven by a main shaft so as to produce crushing forces in a crushing chamber that is defined by outer and inner wear parts. The crusher head is typically either integrally formed or attached to the main shaft by cone fit or interference fit. In the latter, the crusher head or support cone defines a hole of given height and of a diameter that sufficiently expands on heating so that the crusher head can be placed onto the main shaft. On cooling to same temperature with the main shaft, the interference fit keeps the crusher head firmly in place. Interference fit is also used to attach train wheels on their shafts.

The interference fit of a cone crusher head is exposed to far more complex dynamic force variation that in train wheels. The cone crusher head tends to perform a major part of the crushing work near the outmost rim that is at the bottom region of the crusher head. The main shaft has bearings that require lubrication and to isolation from the mineral material and other dirt. Therefore, there is a slip ring attached to a fixed bottom part of the cone crusher and the moving crusher head is shaped to contain an armpit like recess that receives the slip ring.

The inventors have analysed forces that are induced in the crushing process and their impact on wear appearing in the crusher head and main shaft. The armpit recess in part accents harmful forces which increase mutual sliding distance between the crusher head and the main shaft. That is, the crushing forces induce local forces at the interference fit region which sometimes exceed the forces produced by the thermal expansion (or contraction) so that mutual sliding may arise in the magnitude of tens of micro meters. This mutual sliding was studied by the inventors with respect of a number of factors including the geometry of the shaft and of the crusher head.

The inventors have now invented particular improvements in the crusher head and main shaft, which result in significant reduction of fretting wear of the crusher head and of the main shaft. It is an object of the present invention to reduce fretting wear of a cone crusher head interference fit. An alternative object of the present invention is to at least provide a new technical alternative.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a main shaft of a cone crusher, comprising:

an interference fit section for supporting a crusher head, the interference fit section having a nominal interference fit diameter $D_{if}$;
- a bottom shaft section extending between a bottom end of the main shaft and the interference fit section;
- the bottom shaft section comprising a bottom part and a neck part;
- wherein the bottom part has a bottom part length $L_{bp}$ and a bottom part diameter $D_{bp}$ that is constant below the neck part on at least 50% of the bottom part length $L_{bp}$;
- the neck part has a neck part diameter that is growing towards the interference fit section;
- the main shaft has a main shaft length $L_{ms}$;
- characterised in that for reducing fretting wear in the interference fit section, $L_{ms}^{1.3}/D_{if}$ is at most 40 $mm^{0.3}$; and
$D_{bp}^{1.421}/D_{if}$ is at most 9.0 $mm^{0.421}$.

The main shaft length $L_{ms}$ may be at least 1200 mm.

Notice that the ratio of $L_{ms}^{1.3}/D_{if}$ is unit-dependent because of different powers of the dividend and divisor. The value is given in millimetre units, which is now raised to the power of 0.3. For example, if $L_{ms}$ were 1300 mm and $D_{if}$ were 270 mm, $L_{ms}^{1.3}/D_{if}$ would equal to $(1300\ mm)^{1.3}/(270\ mm)=41.4\ mm^{0.3}$. Notably, since the dividend and divisor have different powers (1.3 vs. 1), the unit of the ratio is raised to the power of 0.3. Correspondingly, the units in the units in the ratio $D_{bp}^{1.421}/D_{if}$ shall be millimetres and the result is accordingly in a unit $mm^{0.421}$.

Advantageously, the first example aspect has been found to increase the lifetime of the cone crusher head of a commercial cone crusher by reducing load induced deformation of the main shaft in the interference fit section. This advantage has been realised despite an opposite effect caused by respective reduction in crusher head material thickness at the interference fit section as an increased shaft opening is needed into the crusher head.

Further advantageously, it has been found that the first example aspect enables both reducing sliding and contact dissipation energy as well as reducing stresses and stress variation induced to the cone crusher head when attached to the main shaft of the first example aspect.

Further still, it has been found that the inertia of a combination of the main shaft and the crusher head do not increase in proportion with the increased diameter, as the increased inertia on the main shaft side is compensated by reduced inertia on the crusher head side.

Still further advantageously, it has been identified that the increased diameter in the interference fit section also increases loaded surface area in the interference fit section, which further contributes to the reduction of the fretting wear, while the reduced deformation in the interference fit section is believed to mostly contribute in achieved significant work life increase.

The interference fit section may have an interference fit section length B over which the interference fit section is configured to be interference fitted with the crusher head. $D_{bp}^{1.421}/D_{if}$ may be at most 8.0 $mm^{0.421}$.

The main shaft may comprise only one interference fit section for attaching the crusher head. The interference fit section may be longitudinally continuous.

The main shaft may comprise a top part from the interference fit section to a top of the main shaft.

The neck part diameter may be growing towards the interference fit section to the interference fit section diameter. The neck part may be progressively growing towards the interference fit section. The increased diameter of the interference fit section may enable the neck part growing progressively to the diameter of the interference fit section. Progressively curving neck part may reduce stress concentration. The neck part may be growing towards the interference fit section in a first growing section with a first growing radius and closer to the interference fit section, the neck part may be growing in a second growing section with a second growing radius. The first and second growing sections may be separated by a linear growing section. The first growing radius may be greater to the second growing radius. Alternatively, the neck part may be degressively growing towards the interference fit section. The first growing radius may be smaller than the second growing radius. The first growing radius may be at least 50; 150; 250; 350; 450; or 550 mm. The first growing radius may be at most 200; 300; 400; 500; or 600 mm. The second growing radius may be at least 50; 150; 250; 350; 450; or 550 mm. The second growing radius may be at most 200; 300; 400; 500; or 600 mm.

The nominal interference fit section diameter may be suited for interference fitting to a diameter of a crusher head having an interference fit of the nominal interference fit diameter.

The interference fit section may be conical to some extent. In this case, the nominal interference fit section diameter refers to an average diameter in the interference fit section The main shaft may be configured to laterally support the crusher head only by the interference fit section. Advantageously, by solely supporting the crusher head laterally by the interference fit section, there is no need to allow some of the height of the main shaft to be used for additional lateral supporting the crusher head. In return, the interference fit section may be made longer in the longitudinal direction and thus the fretting wear can be still further reduced. Further advantageously, machining of the crusher head is made simpler by removing a need to machine opening sections of different radiuses for the longitudinal support. The interference fit section may have a longitudinal length of at least 50% of the longitudinal length or height of the cone crusher head.

The interference fit section may have a longitudinal length of at most 70% of the longitudinal length or height of the cone crusher head. Advantageously, the enhanced interference fit section of the first example aspect may structurally allow the cone crusher head have at least 30% vertical overhang with relation to the interference fit section length.

The interference fit section may have a nominal diameter of at most 70% of the longitudinal length or height of the cone crusher head.

According to a second example aspect there is provided a system comprising a main shaft of the first example aspect and a cone crusher head configured for interference fit attaching to the main shaft interference fit section.

The cone crusher head may have a cone sector of at least 45 degrees. The cone crusher head may have a cone sector of at least 50 degrees. The cone crusher head may have a cone sector of at least 55 degrees.

The cone sector may refer to a sector of a central cross-sectioned crusher head between opposite support surfaces.

The cone crusher head may have a cone sector of at most 55 degrees. The cone crusher head may have a cone sector of at most 60 degrees. The cone crusher head may have a cone sector of at most 70 degrees.

The interference fit section may have a nominal diameter of at least 40% of a diameter of the cone crusher head.

The cone crusher head may be attached to the main shaft.

According to a third example aspect there is provided a cone crusher comprising the system of the second example aspect.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying Figures, in which.

DETAILED DESCRIPTION

In the following description, like reference signs denote like elements or steps.

Figure 1:
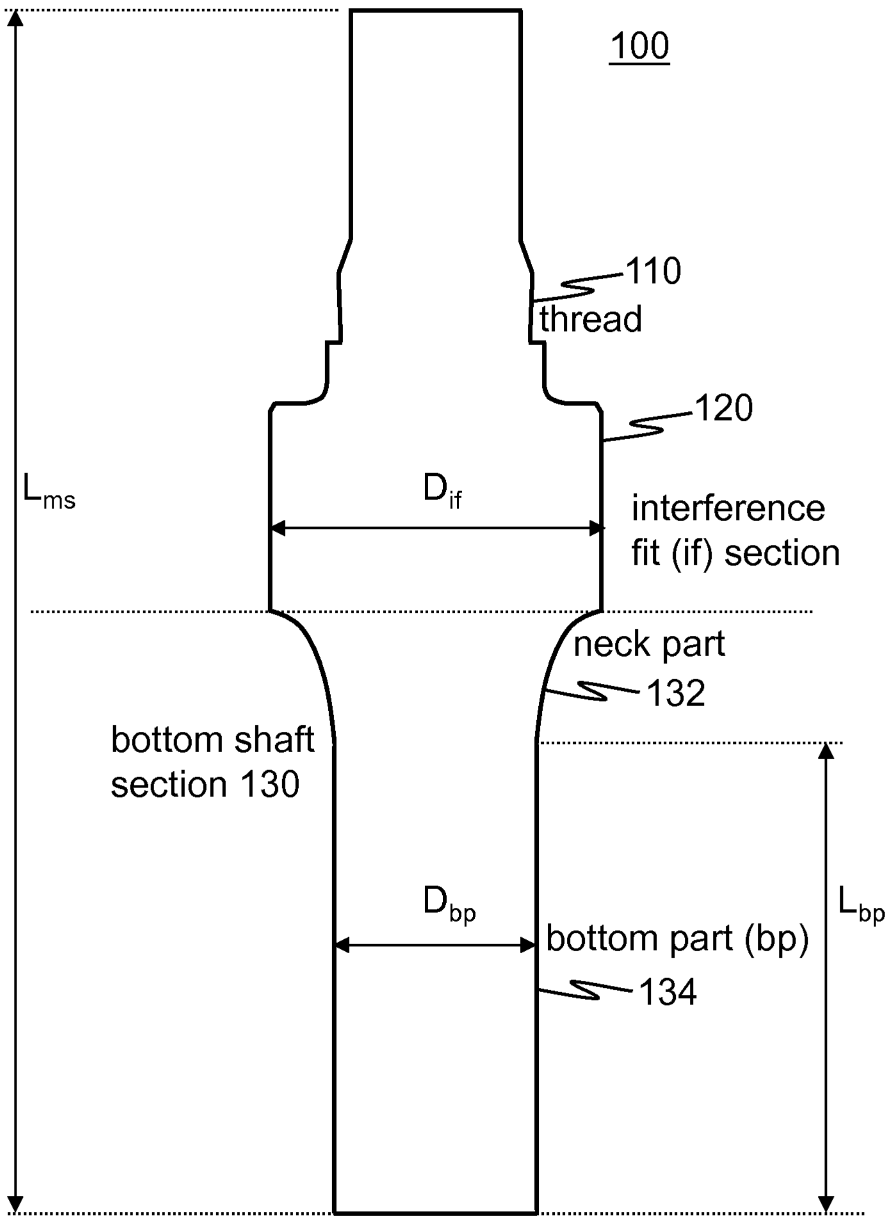
FIG. 1 schematically shows a main shaft of an example embodiment.

FIG. 1 schematically shows a main shaft 100 of an example embodiment. FIG. 1 shows some portions and dimensions of the main shaft (mms), such as a thread 110 for attaching a wear part (not shown) by a nut (not shown); an interference fit section 120; a bottom shaft section 130 that comprises a bottom part 134 and a neck part 132 between the bottom part 134 and the interference fit section (120).

FIG. 1 shows some dimensions such L stands for length, D stands for diameter, and a subscript indicates the object in question.

In FIG. 1, the bottom part has a constant diameter over its entire length, notwithstanding some possible rounding at the very bottom end. In some other embodiments, the bottom part may have some portions of greater or smaller diameter, but the diameter of the bottom part is present on at least 50% of the length of the bottom part. It is also possible that this at least 50% is formed of two or more portions.

The interference fit section has a nominal diameter $D_{if}$ that is configured to fit for cone crusher heads of a shaft opening having the nominal diameter $D_{if}$. In an embodiment, one or both ends of the interference fit section have slightly greater nominal diameter, e.g., in the range of tens or hundreds of parts per million in comparison to the nominal diameter $D_{if}$.

As in FIG. 1, the main shaft comprises in an example embodiment only one interference fit section for attaching the crusher head. Preferably, the interference fit section is longitudinally continuous.

As shown in FIG. 1, the neck part has a neck part diameter that is growing towards the interference fit section. In FIG. 1 embodiment, the neck part grows to the nominal diameter, or in other words, the surface of the main shaft deviates from a perpendicular plane formed with relation to an axial direction of the main shaft, all the way from the centre of the interference fit section 120 over the neck part.

Figure 2:
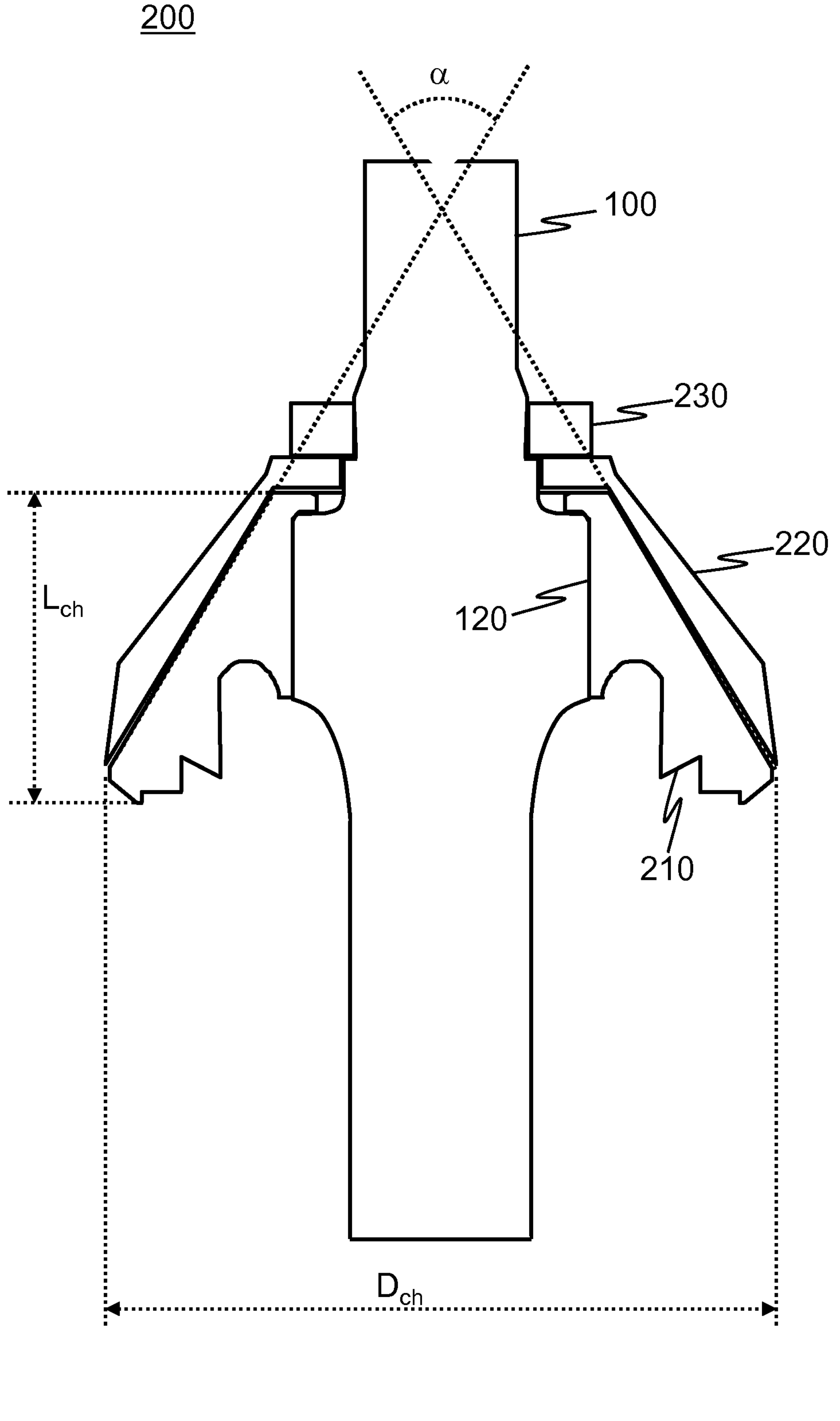
FIG. 2 schematically shows a system of main shaft and a cone crusher head of an example embodiment.

As also shown in FIGS. 1 and 2, the main shaft 100 can be configured to laterally support or at least to laterally engage with the crusher head only by the interference fit section.

In the main shaft 100 of FIG. 1, fretting wear is reduced in the interference fit section by forming the interference section and the bottom part such that ratio $L_{ms}^{1.3}/D_{if}$ is at most 40 $mm^{0.3}$; while the dimensions of the interference fit section 120 and of the bottom part are such that $D_{bp}^{1.421}/D_{if}$ is at most 9.0 $mm^{0.421}$.

It is appreciated that the main shaft 100 and a cone crusher head will form a system. The greater the diameter is at the interference fit section, the wider an opening is required in the crusher head and thus the thinner the structures will be there. It would appear intuitive to assume that since the shaft is squeezed on all sides by the interference fit attached crusher head, the system will become more prone to deformations when the diameter is increased. Surprisingly, though, it was found that in two different commercially available cone crushers, the sliding distance under different loads and fretting wear were reduced in the range of tens percent or even more. While the entire force system is not fully understood, it is believed that the fretting wear can be reduced ratio $L_{ms}^{1.3}/D_{if}$ being at most 40 $mm^{0.3}$. In an example embodiment, the ratio $L_{ms}^{1.3}/D_{if}$ is at most 37.5 $mm^{0.3}$. In an example embodiment, the ratio $L_{ms}^{1.3}/D_{if}$ is at least 30 $mm^{0.3}$. In another example embodiment, the ratio $L_{ms}^{1.3}/D_{if}$ is at least 32.5 $mm^{0.3}$. The second condition, $D_{bp}^{1.421}/D_{if}$, is expected to operate through dynamics over the bottom part of the main shaft that extend over the interference fit section 120. In an example embodiment, this ratio is at most 8.0 $mm^{0.421}$. In an example embodiment, this ratio is at most 7.7 $mm^{0.421}$. In an example embodiment, this ratio is at least 6.4 $mm^{0.421}$ or at least 6.9 $mm^{0.421}$.

FIG. 2 shows a system 200 of the main shaft 100 and a cone crusher head 210 of an example embodiment. FIG. 2 also shows an inner wear part 220 attached to the cone crusher head 210 by a nut 230. FIG. 2 also illustrates by dashed extensions a cone sector of the cone crusher head 210. Moreover, FIG. 2 shows a cone crusher head diameter $D_{ch}$ and a cone crusher head length $L_{ch}$ that is the longitudinal length or height of the cone crusher head 210.

Figure 3:
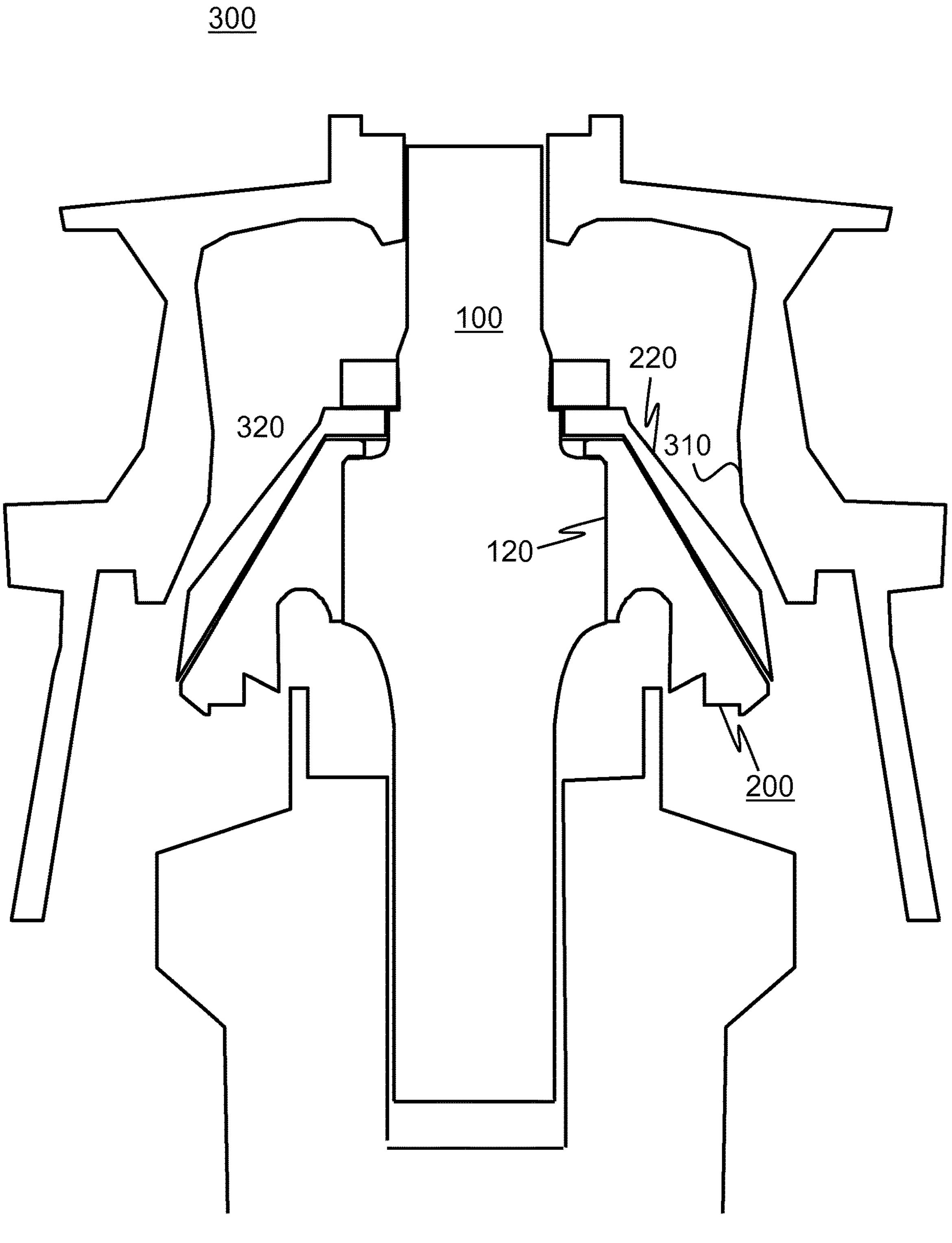
FIG. 3 schematically shows a cone crusher comprising the system of FIG. 2.

FIG. 3 schematically shows a cone crusher 300 comprising the system of FIG. 2, comprising the main shaft 100, the cone crusher head 210, an outer wear part 210 and a crushing chamber 320 between the inner and outer wear parts 210, 310.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A main shaft of a cone crusher, comprising:

an interference fit section for supporting a crusher head, the interference fit section having a nominal interference fit diameter $D_{if}$;

a bottom shaft section extending between a bottom end of the main shaft and the interference fit section;

the bottom shaft section comprising a bottom part and a neck part;

wherein the bottom part has a bottom part length $L_{bp}$ and a bottom part diameter $D_{bp}$ that is constant below the neck part on at least 50% of the bottom part length $L_{bp}$;

the neck part has a neck part diameter that is growing towards the interference fit section;

the main shaft has a main shaft length $L_{ms}$;

wherein for reducing fretting wear in the interference fit section, $L_{ms}^{1.3}/D_{if}$ is at most 40 $mm^{0.3}$; and $D_{bp}^{1.421}/D_{if}$ is at most 9.0 $mm^{0.421}$.

2. The main shaft of claim 1, wherein the main shaft length $L_{ms}$ is at least 1200 mm.

3. The main shaft of claim 1, wherein $D_{bp}^{1.421}/D_{if}$ is at most 8.0 $mm^{0.421}$.

4. The main shaft of claim 2, wherein $D_{bp}^{1.421}/D_{if}$ is at most 8.0 $mm^{0.421}$.

5. The main shaft of claim 1, wherein $D_{bp}^{1.421}/D_{if}$ is at least 6.4 $mm^{0.421}$.

6. The main shaft of claim 2, wherein $D_{bp}^{1.421}/D_{if}$ is at least 6.4 $mm^{0.421}$.

7. The main shaft of claim 1, wherein $L_{ms}^{1.3}/D_{if}$ is at least 30 $mm^{0.3}$.

8. The main shaft of claim 2, wherein $L_{ms}^{1.3}/D_{if}$ is at least 30 $mm^{0.3}$.

9. The main shaft of claim 1, wherein the interference fit section is longitudinally continuous.

10. The main shaft of claim 1, wherein the main shaft is configured to laterally support the crusher head only by the interference fit section.

11. The main shaft of claim 1, wherein at maximum the neck part diameter meets the interference fit section diameter.

12. The main shaft of claim 1, wherein the neck part is progressively curving for reducing stress concentration.

13. A system comprising:

a main shaft comprising:

an interference fit section for supporting a crusher head, the interference fit section having a nominal interference fit diameter $D_{if}$;

a bottom shaft section extending between a bottom end of the main shaft and the interference fit section;

the bottom shaft section comprising a bottom part and a neck part;

wherein the bottom part has a bottom part length $L_{bp}$ and a bottom part diameter $D_{bp}$ that is constant below the neck part on at least 50% of the bottom part length $L_{bp}$;

the neck part has a neck part diameter that is growing towards the interference fit section;

the main shaft has a main shaft length $L_{ms}$;

wherein for reducing fretting wear in the interference fit section, $L_{ms}^{1.3}/D_{if}$ is at most 40 $mm^{0.3}$; and $D_{bp}^{1.421}/D_{if}$ is at most 9.0 $mm^{0.421}$; and a cone crusher head configured for interference fit attaching to the interference fit section of the main shaft.

14. The system of claim 13, wherein the cone crusher head has a cone sector of at least 45 degrees.

15. The system of claim 13, wherein the cone crusher head has a cone sector of at least 55 degrees.

16. The system of claim 13, wherein the cone crusher head is attached to the main shaft.

17. A cone crusher comprising:

a main shaft, the main shaft comprising:

an interference fit section for supporting a crusher head, the interference fit section having a nominal interference fit diameter $D_{if}$;

a bottom shaft section extending between a bottom end of the main shaft and the interference fit section;

the bottom shaft section comprising a bottom part and a neck part;

wherein the bottom part has a bottom part length $L_{bp}$ and a bottom part diameter $D_{bp}$ that is constant below the neck part on at least 50% of the bottom part length $L_{bp}$;

the neck part has a neck part diameter that is growing towards the interference fit section;

the main shaft has a main shaft length $L_{ms}$;

wherein for reducing fretting wear in the interference fit section, $L_{ms}^{1.3}/D_{if}$ is at most 40 $mm^{0.3}$; and $D_{bp}^{1.421}/D_{if}$ is at most 9.0 $mm^{0.421}$; and a cone crusher head configured for interference fit attaching to the interference fit section of the main shaft.

* * * * *